United States Patent

Michaels et al.

Patent Number: 6,121,692
Date of Patent: Sep. 19, 2000

[54] CIRCUIT AND METHOD FOR ESTABLISHING TWO-WAY COMMUNICATION BETWEEN THE STEERING COLUMN AND THE STEERING WHEEL OF A VEHICLE

[75] Inventors: Paul A. Michaels, Livonia; Irvin B. Rea, Royal Oak, both of Mich.

[73] Assignee: Eaton Corporation, Cleveland, Ohio

[21] Appl. No.: 09/395,616

[22] Filed: Sep. 14, 1999

[51] Int. Cl.$^7$ ................................................ H01F 27/42
[52] U.S. Cl. .................................. 307/10.1; 307/9.1
[58] Field of Search ..................... 280/735; 307/10.1, 307/9.1

[56] References Cited

U.S. PATENT DOCUMENTS

| | | | |
|---|---|---|---|
| 5,636,863 | 6/1997 | Reid et al. | 280/735 |
| 5,906,392 | 5/1999 | Reid et al. | 280/735 |
| 5,934,704 | 8/1999 | Hansen et al. | 280/735 |
| 5,945,744 | 8/1999 | Dobler et al. | 307/10.1 |
| 5,994,788 | 11/1999 | Dobler et al. | 307/10.1 |
| 6,012,736 | 1/2000 | Hansen et al. | 280/735 |

OTHER PUBLICATIONS

Eaton Corporation document "Non–Contact Steering Column Interface" by Scott Reid, Corporate R&D pp. 1–6 No Date.

SAE document "Contactless Air–Bag Firing and Signal Transmission on the Steering Wheel with an Inductive Contact Unit" by Erich Zabler, Anton Dukart & Thomas Herrmann, Robert Bosch GmbH pp. 1–12, Feb. 23, 1998.
Martin Scheck document "Dynamic simulation of a transformer for a contactless clockspring design used for functional information exchange of airbag, cruise control and other systems." pp. 1–59, Apr. 1998.

*Primary Examiner*—Stephen W. Jackson
*Assistant Examiner*—Sharon Polk
*Attorney, Agent, or Firm*—Rader, Fishman & Grauer PLLC

[57] ABSTRACT

The disclosed invention comprises an electronic control circuit for transferring power and data signals between an electronic circuit associated with a vehicle steering column and an electronic circuit associated with a vehicle steering wheel. Communication between the column circuit and the wheel circuit is accomplished by a rotary transformer having a primary and a secondary magnetic coil, wherein the primary magnetic coil is associated with the steering column and the secondary magnetic coil is associated with the steering wheel. The column circuit and the wheel circuit both include data signals that are transferred to the other across the rotary transformer. The column circuit also includes a power supply which provides power to the wheel circuit across the rotary transformer. Power supplied to the wheel circuit is stored in at least one storage device in the wheel circuit, which then provides the power to the components of the wheel circuit, including an air bag squib driver circuit for firing air bag squibs.

23 Claims, 2 Drawing Sheets

CIRCUIT AND METHOD FOR ESTABLISHING TWO-WAY COMMUNICATION BETWEEN THE STEERING COLUMN AND THE STEERING WHEEL OF A VEHICLE

TECHNICAL FIELD OF THE INVENTION

The disclosed invention relates to vehicle control systems. More particularly, the disclosed invention pertains to a control system capable of generating an air bag deployment signal upon a vehicle collision for an air bag stored in a steering wheel/column while also transferring a biasing power signal to control circuitry in the steering wheel and communicating selected driver control signals between the wheel and the column.

BACKGROUND

When vehicle air bags were initially introduced on the market, it was necessary to remove driver control functions from the steering wheel and install them on stalks that emanated from the steering column. Typically, the only two items which remained wheel-mounted were the air bags and the horn. The signal for the horn was transferred from the wheel to the column through slip rings. The slip rings consisted of a ball contact located on the steering wheel and a circular conductor which was part of a "clock spring". The clock spring was a molded plastic part which housed a two conductor ribbon cable that connected the air bag to its control module. Such a clock spring is capable of maintaining electrical connections during rotation of the wheel.

The numerous design concepts comprising adaptations of slip rings and clock rings have been fraught with problems and are of limited economic and practical value. Slip ring arrangements have always suffered from reliability and performance problems due to the inherent nature of the slip ring structure itself. The electrical integrity of the contacting methods necessarily depreciate over time and from dirt and/or wear and varying ambient conditions. In addition, as the demand for the placement of driver controls back onto the steering wheel has become greater, the complexity and cost to manufacture clock springs have increased, and their reliability have decreased. Attempting to compensate for the increased cost and decreased reliability of clock springs, some applications have included the use of a rotary transformer between the steering wheel and the steering column to generate a "contactless" system. But the known approaches for firing the gas generators (squibs) that deploy the air bags all use a direct firing method which necessitates a complex and expensive rotary transformer. Moreover, the known methods for transferring data between steering wheel and the column require a transformer with very limited in-line and runout assembly tolerances.

Accordingly, it is desirable to have an improved apparatus and method for firing air bag squibs and for transferring power and data between the vehicle steering wheel and the steering column.

SUMMARY OF THE INVENTION

This invention comprises an electronic control circuit and method using a rotary transformer to facilitate the transfer of power and two-way communications between the column and steering wheel of a vehicle. The invented apparatus and method also provide for the efficient firing of air bag squibs. The invented circuit and method consist of a steering column circuit and a steering wheel circuit coupled together by a rotary transformer through which the column circuit provides power to the wheel circuit, and through which both circuits transfer data to the other. The primary magnetic coil of the rotary transformer is associated with the column circuit, and the secondary magnetic coil of the transformer is associated with the wheel circuit.

The column circuit is powered by the vehicle's battery. A surge protection circuit is disposed between the vehicle battery and the rest of the column circuit to protect the system against transients on the battery. The vehicle battery provides power to a column circuit microprocessor. The column circuit microprocessor receives various data input signals, including an input signal relating to when the vehicle air bags are to be deployed. Outputs from the column microprocessor include a signal to a coil driver circuit and a signal to a capacitor connect circuit. The capacitor connect circuit is connected to a tuning capacitor which is connected to the rotary transformer.

The wheel circuit includes two storage capacitors that store power transferred from the column circuit to the wheel circuit and which act as the power source for the wheel circuit. The wheel circuit also includes a wheel circuit microprocessor that receives and transmits various inputs and outputs relating to the control of functions on the vehicle steering wheel. The wheel circuit also includes a squib driver circuit which controls the firing of air bag squibs in response to a "fire squib" control signal received from the column circuit.

During normal operation, the disclosed circuit repetitively alternates between a power transfer mode and a data transfer mode by multiplexing time across the rotary transformer. The column microprocessor supplies a pulse train to the coil driver circuit, which in turn periodically applies full power from the vehicle battery to the transformer's primary coil, or "column coil". When the pulses supplied to the column coil by the coil driver are "on", the column microprocessor and the capacitor connect circuit 36 disconnect the tuning capacitor CR from the column coil. When the pulses are "off", the tuning capacitor is reconnected, at which time energy stored in the tuning capacitor is supplied across the rotary transformer. By connecting the tuning capacitor CR to the column coil only during the time that the coil driver circuit is turned "off", the power required to drive the control circuit is minimized and the energy recovered from the column coil is maximized. A voltage-level feedback switch from the wheel circuit to the column circuit allows the column microprocessor to adjust the width of the pulses supplied to the column coil to maintain a constant power level at the wheel circuit. The power supplied by the column circuit to the wheel circuit is stored in the storage capacitors. The energy in the storage capacitors is used to power the components of the wheel circuit, including the squib driver circuit.

After a preset length of time allotted for the power transfer mode, the column microprocessor causes the control circuit to change to the data transfer mode. During this mode, the column circuit transmits a preset number of data bits to the wheel circuit across the rotary transformer, and then the wheel circuit transmits a preset number of bits to the column circuit across the rotary transformer. Then, the circuit returns to the power transfer mode and repeats the sequence.

If at any time the column microprocessor receives a signal to activate the vehicle air bags, the column microprocessor immediately changes the mode of the control circuit to "fire squib" mode. The column microprocessor transmits a "fire squib" control signal across the rotary transformer to the wheel microprocessor which then sends a signal to the squib driver circuit to fire the air bag squibs.

DETAILED DESCRIPTION OF THE INVENTION

Figure 1:
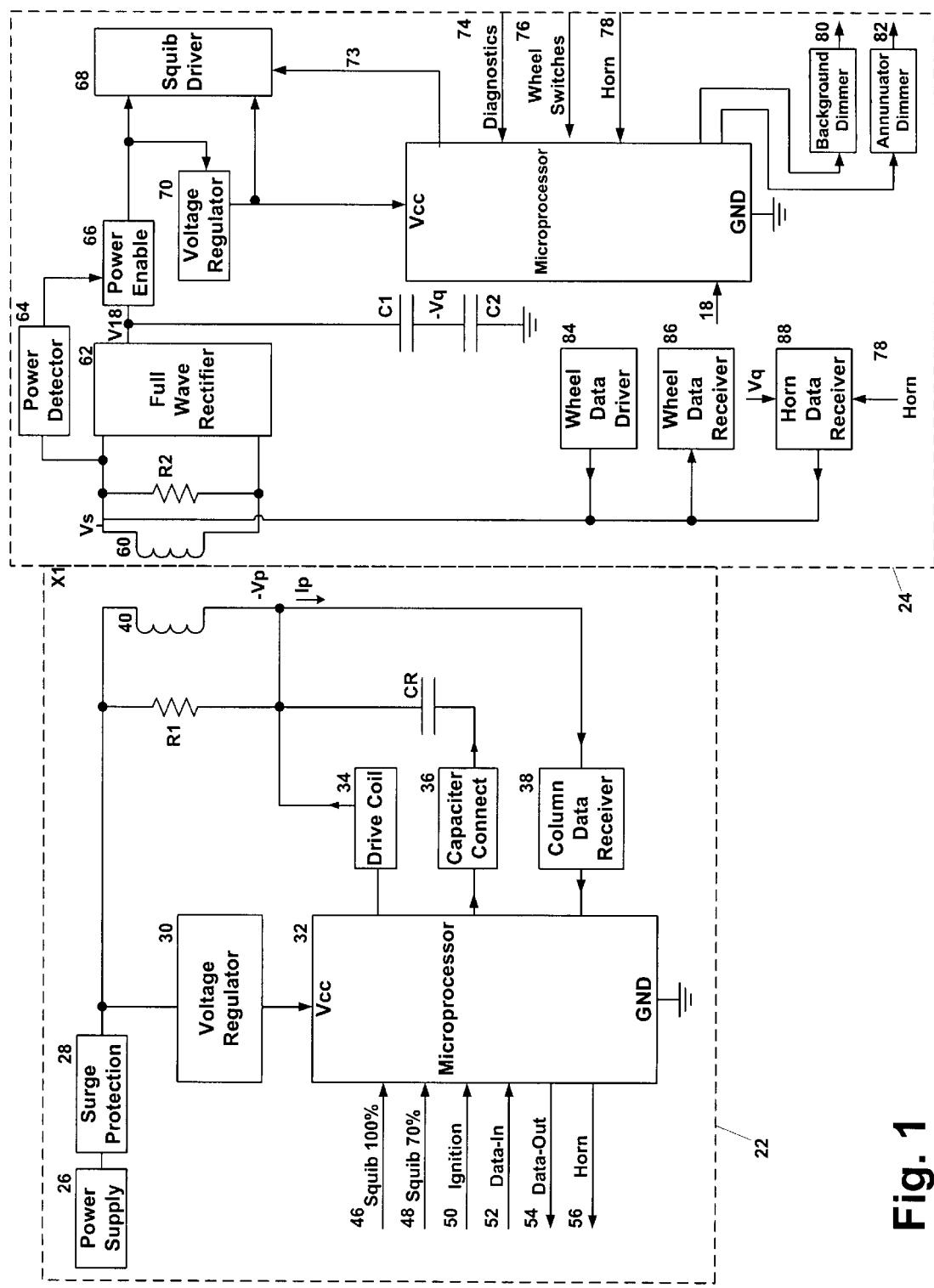
FIG. 1 shows a detailed illustration of the disclosed control circuit according to a preferred embodiment of the invention.

Referring to FIG. 1, the disclosed electronic control system 20 comprises a steering column circuit 22 and steering wheel circuit 24. Both circuits are preferably fabricated on circular printed circuit boards. In a preferred embodiment, wheel circuit 24 is mounted to the steering wheel of the vehicle (not shown), and column circuit 22 is mounted to the steering column of the vehicle (not shown).

Column circuit 22 receives power from a power supply 26, preferably the vehicle's 12-volt battery, which is passed through a surge protection circuit 28 to protect the circuitry of the control circuit 20 from various transients that can appear on the power source 26. Various surge protection circuits are well-known to one of ordinary skill in the art. Power supply 26 provides power to a voltage regulator 30, which provides regulated power to a column circuit microprocessor 32. The voltage regulator 30 is preferably a 5-volt regulator. Power source 26 also provides power to a column coil 40 which serves as the primary winding of rotary transformer X1. The voltage across the column coil 40 is referred to as $V_p$, and the current passing through the column coil is referred to as $I_p$. The column coil 40 is preferably assembled to the bottom side of the column circuit board (not shown). Transformer X1 is preferably an air core transformer.

A coil driver circuit 34 receives signals from the column microprocessor 32 and, in response thereto, regulates the power provided by the power supply 26 to the column coil 40. Column coil 40 communicates with a column data receiver circuit 38, which provides input to the column microprocessor 32.

Resistor R1 is connected in parallel across column coil 40 and between surge protection circuit 28 and coil driver circuit 34. A tuning capacitor CR is connected between resistor R1 and a capacitor connect circuit 36. Capacitor connect circuit 36 receives input signals from column microprocessor 32, and, based thereon, connects and disconnects tuning capacitor CR to/from column coil 40. In a preferred embodiment, additional input signals to the column microprocessor 32 include a squib 100% signal 46, a squib 70% signal 48, an ignition signal 50, and a data in signal 52. Additional output signals from the column microprocessor 32 include a data out signal 54 and a horn signal 56. The purposes of functions of these additional input and output signals to the column microprocessor 32 are well-known to one of ordinary skill in the art.

The wheel circuit 24 includes a wheel circuit coil 60 which constitutes the secondary winding of the transformer X1. The voltage potential across wheel coil 60 is referred to as $V_s$. Wheel coil 60 is preferably assembled to the bottom side of the wheel circuit board containing wheel circuit 22. Wheel coil 60 is connected to a full wave rectifier 62, and energy supplied to wheel coil 60 charges energy storage capacitors C1 and C2 through full wave rectifier 62. The energy stored in capacitors C1 and C2 constitute the power source for wheel circuit 22. The voltage signal from the full wave rectifier 62 that biases capacitors C1 and C2 is referred to as V18 and the voltage level across C2 alone is referred to as V9.

Wheel coil 60 is connected to a power detector circuit 64 which is connected to a power enable circuit 66. Power detector circuit 64 receives signals from column circuit 22 through rotary transformer X1 and, based upon those signals, determines if the vehicle's ignition is on, and thus whether power is being supplied from the power supply 26 to the control circuit 20. Power detector circuit 64 provides a signal to a power enable circuit 66 that shuts down the wheel circuit 24 if the power detector circuit 64 determines that the column circuit 22 is not supplying power to the wheel circuit 24. The voltage regulator 70 is preferably a 5-volt regulator.

In a preferred embodiment, wheel microprocessor 72 receives input signals from a diagnostics signal 74, a wheel switch signal 76, a horn signal 78, and a bias voltage V18. The wheel microprocessor 72 provides output signals to a background dimmer circuit 80, an annunciator dimmer circuit 82, and a wheel data driver circuit 84. The purposes and functions of these various input signals and output signals to wheel microprocessor 72 are well-known by one of ordinary skill in the art.

A wheel data driver circuit 84 receives output signals from wheel microprocessor 72 and provides these output signals to wheel coil 60 for transfer to the column circuit 22. The wheel microprocessor 72 also receives input from the wheel data receiver circuit 86 which itself receives input from the wheel coil 60. A horn data driver 88 receives input from a horn signal 78 and provides output to the wheel coil 60. The horn data driver 88 is powered by voltage V9. Resistor R2 is connected in parallel across the terminals of wheel coil 60.

In operation, the main source of power for the entire system 20 originates from the power supply 26 in the column circuit 22. Power from the power supply 26 must be provided from the column circuit 22 to the wheel circuit 24. Moreover, various commands and other data originate in both the column circuit 22 and the wheel circuit 24 and must be communicated between the two circuits. For example, commands originating in the vehicle system with the steering wheel as an activity vector, such as "fire the 70% squib", "illuminate the cruise control annunciator", or "change the steering wheel's background dimming level to 32%", must be passed to the wheel microprocessor 72. Similarly, data and commands originating at the steering wheel, such as "blow the horn", "increase the radio sound level", or "the squib supply voltage is 15.5 volts", must be passed to the column microprocessor 32. In the disclosed invention, the rotary transformer X1 provides the communication link between the steering wheel circuit 22 and the steering wheel circuit 24 for both power supply purposes and two-way data transfer. Unlike the known slip ring or clock spring based systems, the disclosed invention does not have any wires connecting the vehicle steering wheel circuits and the column circuits.

In a "normal mode" of operation of the control circuit 20, the efficient transfer of power and the two-way flow of data across the rotary transformer X1 are implemented by establishing two operational modes—a power transfer mode and a data transfer mode—and multiplexing the power transfer mode and the data transfer modes. A "fire squib" mode is also employed, which, when triggered, immediately overrides both the power transfer mode and the data transfer mode to enable the system to fire the air bag squibs.

In a preferred embodiment of the invention, the normal mode of the control circuit 20 is characterized by repetitively alternating between the power transfer mode and the data transfer mode. First, operating in the power transfer mode, the column circuit 22 provides power to the wheel circuit 24. Column microprocessor 32 supplies a pulse train to coil driver circuit 34, which in turn periodically applies full power from the power source 26 to the column coil 40. In a preferred embodiment, the pulse train is supplied at a frequency of approximately 25 kHz. The total amount of power transferred from the column circuit 22 to the wheel circuit 24 is determined by the duration or length of the voltage pulses provided by the power supply 26. The width of each pulse of power is controlled and calculated to deliver just enough power from power supply 26 during each driving pulse to produce a fixed voltage on storage capacitors C1 and C2. In a preferred embodiment, the width of each power pulse is set to deliver nominal voltage levels on storage capacitors C1 and C2 of 18 volts and 9 volts, respectively.

Figure 2:
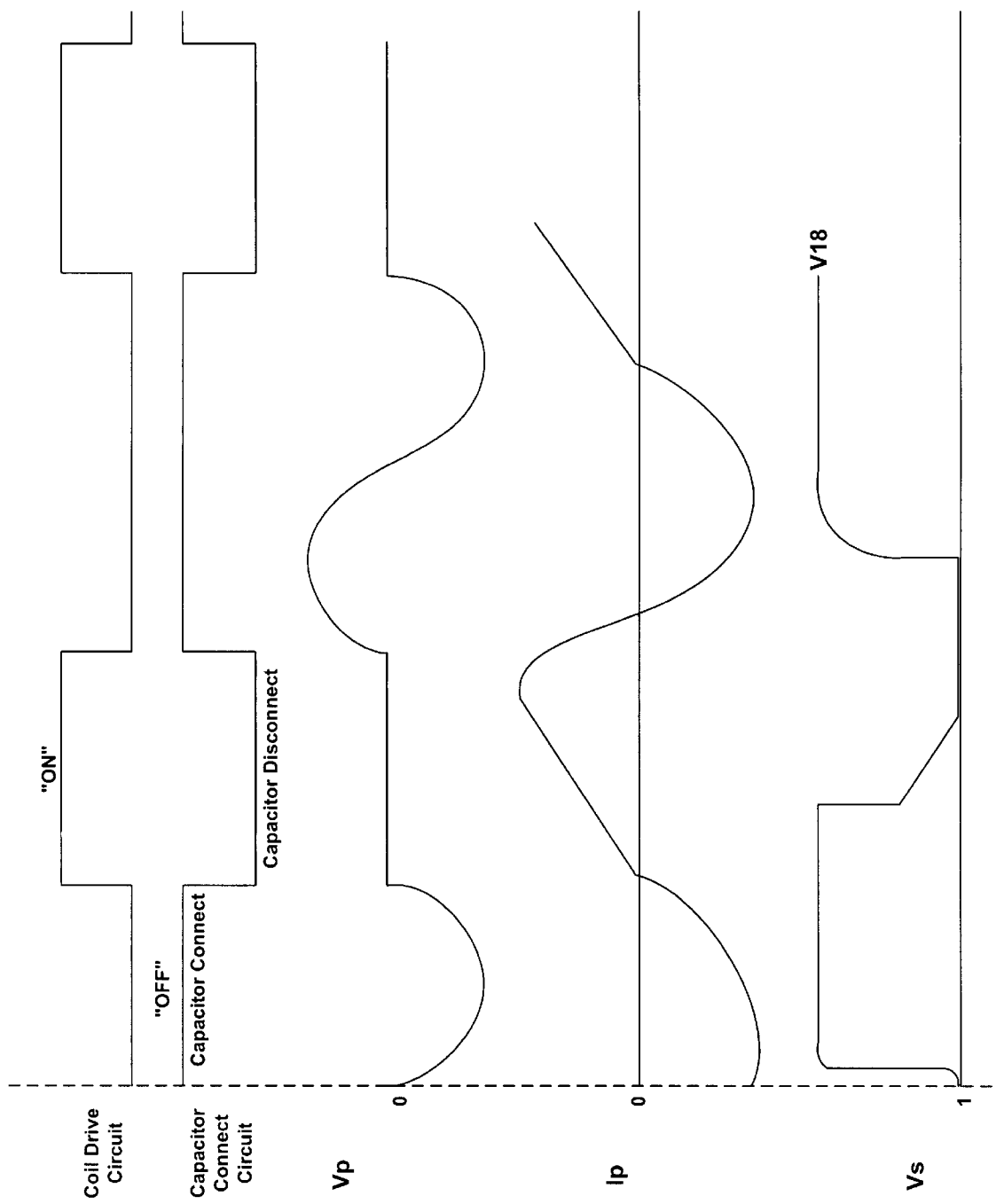
FIG. 2 shows timing wave forms relating to the operation of the disclosed control circuit in the power mode according to a preferred embodiment of the invention.

A preferred set of waveforms for the power mode operation are shown in FIG. 2. When the pulses supplied to the column coil 40 by the coil driver circuit 34 are "on", as shown in FIG. 2, the column microprocessor 32 and the capacitor connect circuit 36 disconnect the tuning capacitor CR. The column coil voltage $V_p$ is very close to ground reference at this time, and the current through column coil 40, $I_p$, ramps up linearly. At the end of each "on" pulse, the column microprocessor 32 and the capacitor connect circuit 36 reconnect the tuning capacitor CR, and, as a result, the column coil voltage $V_p$ rings sinusoidally. During this phase, when the pulse supplied to the column coil 40 is "off", the energy stored in column coil 40 is coupled to both the tuning capacitor CR and to the wheel coil 60. The energy coupled from the column coil 40 to the wheel coil 60 charges the storage capacitors C1 and C2, one when the coil driver circuit is "on" (the "driven" phase) and the other when the coil driver circuit is "off" (the "ringing" phase). FIG. 2 illustrate the resulting voltage potential, $V_s$, across the wheel coil 60 compared to the pulse train supplied by the coil driver circuit 34. This repetitive process is maintained for a preset period of time while the circuit is in the power transfer mode.

By connecting the tuning capacitor CR to the column coil 40 only during the time that the coil driver circuit 34 is turned "off", the power required to drive the control circuit 20 is minimized and the energy recovered from column coil 40 is maximized. The use of the tuning capacitor CR facilitates a continuous supply of power from the column circuit to the wheel circuit and facilitates the use of energy stored in the leakage inductance of the column coil. The disclosed system and method is in contrast to the known method of transferring the stored energy to a Zener diode "protection device", where the energy stored in the leakage inductance of the column coil is dissipated as heat.

It should be appreciated that the wheel power load can be highly variable as a result of the selective activation and deactivation of various options, such as background lights and annunciators on the steering wheel. Moreover, the voltage bias V18 is affected by factors such as the width of the gap between column coil 40 and wheel coil 60, as well as the voltage level of the power source 26. Together, these parameter variations can cause squib firing voltage V18 to vary significantly. This is not a desirable condition. To compensate for this potential variation, squib firing voltage V18 is monitored by wheel microprocessor 72, which receives squib firing voltage V18 as an input directly from the full wave rectifier 62. A digitally-encoded copy of the squib firing voltage V18 is coupled back to the column microprocessor 32 through the wheel data driver circuit 84 and rotary transformer X1. The column microprocessor 32 uses the digitally-encoded squib firing voltage V18 as a feedback input signal to calculate a compensating pulse width. Accordingly, the column microprocessor 32 adjusts the driving pulse width to either raise or lower the energy supplied across rotary transformer X1, depending upon whether the squib firing voltage V18 is too high or too low. This methodology maintains the squib firing voltage V18 approximately constant.

After the control circuit 20 has operated in the power transfer mode for its preset period of time, column microprocessor 32 causes the circuit 20 to change to its data transfer mode. In this mode, data is transferred across the rotary transformer X1, first from the column to the wheel, and second from the wheel to the column. The control circuit 20 is converted to the data transfer mode of operation by disconnecting tuning capacitor CR from the rotary transformer X1. To accomplish this, column microprocessor 32 supplies a low level signal to the capacitor connect circuit 36 which cuts off the tuning capacitor CR. With tuning capacitor CR disconnected, transformer X1 is inherently a wide bandwidth device that can transfer bidirectional data between its coils 40 and 60 efficiently and at high speed.

After disconnecting tuning capacitor CR, the column microprocessor 32 effects a delay sufficient to allow the existing energy in the rotary transformer X1 to dissipate. In a preferred embodiment, that time is approximately 80 microseconds. Thereafter, the column circuit 22 begins to transfer a preset number of data bits across the rotary transformer X1 to the wheel circuit 24 at a preset transmission rate, preferably 16 bits transferred at 25 kHz. In a preferred embodiment of the invention, the logical "0" and logical "1" data bits transferred between the column circuit 22 and the wheel circuit 24 are signified by voltage pulses of different lengths. For example, a voltage pulse of a relatively short duration is considered a logical "0", and a voltage pulse of a relatively long duration is considered a logical "1".

The wheel microprocessor 72 receives the sent data bits and acts upon them accordingly. After the preset number of data bits have been sent from the column circuit 22 to the wheel circuit 24, a nominal delay time is employed to dissipate any remaining voltage in the rotary transformer X1. Then, the wheel circuit 24 sends a preset number of data bits across transformer X1 to column circuit 32, after which the control circuit 20 is switched back into its power transfer mode. The above-described methodology then repeats itself. With respect to the data bits that are transferred back and forth between the column circuit and the wheel circuit, the number of bits may be varied depending upon the number of possible control signals that each circuit needs to convey to the other.

In a preferred embodiment, the first two bits of each data transfer consist of voltage pulse durations corresponding to a logical "0" and a logical "1" that are used for calibration purposes. Specifically, the column microprocessor 32 or the wheel microprocessor 72, depending upon which circuit is receiving data, averages the voltage levels of the first two bits received (the "calibration" bits) and then considers voltage levels below the calculated average to be logic value "0" and voltage levels above the calculated average to be logic value "1".

When the vehicle's air bag is to be activated as a result of the vehicle experiencing a requisite level impact, the vehicle's crash accelerator system (not shown) provides a "fire squib" command to the column microprocessor 32. Upon receipt of the "fire squib" command, the column microprocessor 32 immediately terminates the current operating mode (either power transfer mode or data transfer mode). The column microprocessor 32 then delays a preset length of time, preferably about 80 microseconds, to permit all of the stored energy in the rotary transformer X1 to dissipate. Next, the column microprocessor 32 transmits a "fire squib" command through the coil driver circuit 34 and rotary transformer X1 to the wheel data receiver circuit 86 and ultimately the wheel microprocessor 72. In one embodiment of the invention, the "fire squib" command comprises three pulses delivered at 40 microsecond intervals. The first pulse is ten microseconds wide, which differentiates the "fire squib" command from all other commands. The second pulse is either three microseconds or one microseconds wide, which is interpreted by the wheel microprocessor as an indication to either fire or not fire the 30% squib, respectively. If the second pulse is three microseconds wide, the command is interpreted to fire the 30% squib. Similarly, the third pulse is either three microseconds or one microsecond wide, and it is interpreted as a command to either fire or not fire the 70% squib, respectively. If the third pulse is three microseconds wide, the command is interpreted to fire the 70% squib. Based upon the "fire squib" command received from the column microprocessor 32, the wheel microprocessor 72 formats a control signal defining the squib fire pulse duration and whether the 30% squib, the 70% squib, or both are to be fired. The wheel microprocessor 72 sends this formatted control signal to the squib driver circuit 68. The squib driver control circuit 68 controls the firing current to the appropriate squibs, as is well-known in the art.

When the vehicle's ignition is turned off, the column microprocessor 32 turns off coil driver circuit 34, capacitor connect circuit 36 and column data receiver circuit 38, and column microprocessor 32 enters a sleep mode that consumes very little power from the vehicle's power supply 26 (battery). When column microprocessor 32 does not present power pulses to the power detection circuit 64 for more than a preset period of time, the power detection circuit 64 turns off the power enable circuit 66, which puts the entire wheel circuit 24, except for the horn data driver 28 (for reasons explained hereinafter), in shutdown mode. In a preferred embodiment, that preset period is approximately 500 milliseconds.

The disclosed invention has several advantages over known system having direct connections between the column circuits and the wheel circuits. First, the disclosed invention is a much more efficient circuit and method for providing power and two-way communications across a rotary transformer. Moreover, the disclosed invention provides an improved circuit and method for firing air bag squibs without direct wiring between a vehicle's steering column and steering wheel.

Another advantage of the disclosed invention is its ability to permit the vehicle's horn to be activated with the vehicle's ignition turned off. Known systems having direct connections between the column circuits and the wheel circuits must rely on low power polling methods operating through the rotary transformer to identify horn switch closure by a user. The disclosed invention permits the vehicle's horn to be used when the ignition is off by drawing on the power stored in storage capacitor C2. Horn firing voltage V9 is connected to horn data driver 78. The horn data driver 78 is in standby mode until a "fire horn" signal 78 resulting from the user pressing the horn button on the steering wheel is presented to the horn data driver 88. Upon receiving a "fire horn" signal 78, the horn data driver 88 generates a pulse that is coupled back through the rotary transformer X1 where it wakes up the column microprocessor 32 from its low current drain sleep mode. In response, column microprocessor 32 generates a "horn activate" signal. If the system is designed to permit activation of the horn while the vehicle's ignition is off, then the column microprocessor 32 will be required to be awakened for a few milliseconds at about one minute intervals to replace the energy lost from the storage capacitors C1 and C2 through normal circuit leakage.

Another advantage of the disclosed invention is its ability to successively fire the air bag squibs for at least 350 milliseconds after the vehicle's battery is disconnected. This feature is important because a front end collision could sever the vehicle's battery connection before the vehicle's accelerator system provides a "fire squib" signal. The disclosed invention permits the squib driver circuit 68 to continue to receive power and thus fire the air bag squibs after the vehicle's battery is disconnected because the power supply to the squib driver circuit 68 is maintained in the storage capacitors C1, C2. By properly sizing storage capacitors C1 and C2, they can store sufficient energy to permit the squib driver circuit 68 to fire the squibs with the maximum possible load for a time period greater than 350 milliseconds.

While preferred embodiments of the present invention have been described herein, it is apparent that the basic construction can be altered to provide other embodiments which utilize the processes and compositions of this invention. Therefore, it will be appreciated that the scope of this invention is to be defined by the claims appended hereto rather than by the specific embodiments which have been presented hereinbefore by way of example.

What is claimed is:

1. An electronic control circuit for transferring power and data signals between a vehicle steering column and a vehicle steering wheel, comprising:

a rotary transformer having a primary and a secondary magnetic coil, wherein the primary magnetic coil is associated with the steering column and the secondary magnetic coil is associated with the steering wheel;

an electronic column circuit associated with the steering column for generating a high energy power signal and for transferring said power signal through said transformer;

an electronic wheel circuit associated with the steering wheel for receiving said power signal through said transformer; and said wheel circuit comprising at least one energy storage device in communication with said secondary magnetic coil for storing said power signal supplied by said column circuit.

2. The control circuit in claim 1, wherein said wheel circuit comprises a squib driver circuit in communication with said energy storage device for controlling the firing of vehicle air bag squibs.

3. The control circuit in claim 1, wherein said column circuit comprises a tuning storage device in communication with said primary magnetic coil.

4. The control circuit in claim 3, wherein said tuning storage device is capable of being selectively connected and disconnected to said primary magnetic coil.

5. The control circuit in claim 4, wherein said tuning storage device is a capacitor.

6. The control circuit of claim 1, wherein said column circuit further comprises a means for regulating the level of said power signal transferred from said column circuit to said wheel circuit.

7. The control circuit of claim 6, wherein said wheel circuit further comprises a means for providing a power feedback signal from said wheel circuit to said column circuit.

8. The control circuit of claim 1, wherein
said column circuit comprises a column microprocessor coupled to said primary magnetic coil of said transformer; and
said wheel circuit comprises a wheel microprocessor coupled to said secondary magnetic coil of said transformer.

9. The control circuit of claim 8, wherein said wheel microprocessor transfers a feedback signal through said rotary transformer to said column microprocessor, said feedback signal representing the magnitude of said power signal.

10. The control circuit of claim 1, wherein said wheel circuit further comprises:
a power detector circuit in communication with to said secondary magnetic coil for detecting if said energy power signal is being transferred through said rotary transformer to said wheel circuit; and
a power enable circuit in communication with said power detector circuit for deactivating said wheel circuit if said energy power signal is not being transferred to said wheel circuit.

11. An electronic control circuit for transferring power and data signals between a vehicle steering column and a vehicle steering wheel, comprising:
a rotary transformer having a primary and a secondary magnetic coil, wherein the primary magnetic coil is associated with the steering column and the secondary magnetic coil is associated with the steering wheel;
an electronic column circuit associated with the steering column for generating a high energy power signal and at least one data signal and for transferring said energy power signal and said data signal through said rotary transformer;
an electronic wheel circuit associated with the steering wheel for receiving said power signal and said data signal through said transformer and for generating and transferring at least one data signal through said transformer to said column circuit;
said wheel circuit comprising first and second energy storage capacitors for storing said power signal received from said column circuit; and
a tuning capacitor in communication with said primary magnetic coil.

12. The control circuit of claim 11, wherein said tuning capacitor is capable of being selectively connected to and disconnected from said primary magnetic coil.

13. The control circuit of claim 11, wherein said wheel circuit comprises a squib driver circuit in communication with said first and second energy storage capacitors for controlling the firing of air bag squibs.

14. A method for transferring power between an electronic control circuit associated with a vehicle steering column and an electronic control circuit associated with a vehicle steering wheel circuit through a rotary transformer, comprising the steps:
providing a power signal from a power supply through the rotary transformer to the wheel circuit;
storing said power signal in at least one energy storage device in the wheel circuit; and
providing said power signal from said energy storage device to electronic components of the wheel circuit.

15. The method of claim 14, wherein said step of providing said power signal from a power source through the rotary transformer to the wheel circuit comprises the substep of providing repetitive pulses of said power signal from said power source.

16. The method of claim 15, further comprising the substep of regulating the level of said power signal supplied to the wheel circuit by adjusting the width of said pulses of said power signal.

17. The method of claim 15, wherein the step of providing repetitive pulses of said power signal from said power supply comprises the step of repetitively connecting and disconnecting a tuning capacitor that is in communication with said rotary transformer.

18. A method for transferring power and data between an electronic control circuit associated with a vehicle steering column and an electronic control circuit associated with a vehicle steering wheel circuit through a rotary transformer, comprising the steps:
transferring a power signal from a power supply in the column circuit through the rotary transformer to the wheel circuit for a predetermined length of time;
storing said power signal in at least one energy storage device in the wheel circuit;
supplying said power signal from said energy storage device to electronic components of said wheel circuit;
transferring data from the column circuit to the wheel circuit through the rotary transformer; and
transferring data from the wheel circuit to the column circuit through the rotary transformer.

19. The method of claim 18, further comprising the step of the column circuit selectively transferring a squib control signal through the transformer to the wheel circuit, said squib control signal directing the wheel circuit to fire at least one vehicle air bag squib.

20. The method of claim 18, further comprising the steps:
providing a power feedback signal from the wheel circuit to the column circuit through the rotary transformer; and
adjusting the level of said power signal transferred from the column circuit to the wheel circuit based upon the power feedback signal.

21. The method of claim 18, wherein said step of transferring data from the column circuit to the wheel circuit and said step of transferring data from the wheel circuit to the column circuit comprises transferring voltage pulses that vary in width, wherein the relative widths of the voltage pulses correspond to the nature of the data transferred.

22. The method of claim 18, wherein said step of transferring data from the column circuit to the wheel circuit and said step of transferring data from the wheel circuit to the column circuit comprise the steps:
transferring at least one stream of data voltage pulses wherein each stream includes a reference pulse corresponding to a logical "0" value and a reference pulse corresponding to a logical "1" value; and
calibrating the interpretation of said data bits in said stream based upon said reference data bits.

23. The method of claim 22, wherein said calibrating step comprises calculating the mathematical average of said reference voltage pulses and interpreting data voltage pulses less than said mathematical average as logical "0" data values and interpreting data voltage pulses greater than said mathematical average as logical "1" values.

* * * * *